Nov. 24, 1970  E. R. LOWREY ET AL  3,542,653
APPARATUS AND PROCESS FOR CONTINUOUS HEAT-BLEACHING AND
HIGH TEMPERATURE STEAM DEODORIZATION OF EDIBLE OILS
Filed April 22, 1968

INVENTORS
Erlend R. Lowrey
Richard F. Durchholz
BY
ATTORNEYS

United States Patent Office 3,542,653
Patented Nov. 24, 1970

3,542,653
APPARATUS AND PROCESS FOR CONTINUOUS HEAT-BLEACHING AND HIGH TEMPERATURE STEAM DEODORIZATION OF EDIBLE OILS
Erlend R. Lowrey, Greenhills, and Richard F. Durchholz, Symmes Township, Hamilton County, Ohio, assignors to The Procter & Gamble Company, Cincinnati, Ohio, a corporation of Ohio
Filed Apr. 22, 1968, Ser. No. 722,921
Int. Cl. B01d 3/10; C09f 5/10
U.S. Cl. 203—92        11 Claims

ABSTRACT OF THE DISCLOSURE

An apparatus and process for continuous high temperature (350–500° F.) heat-bleaching and steam deodorization of edible oils in an integrated unit. The apparatus contains a packed deodorization chamber in its center, which is surrounded by and shares a common wall with an annular heat-bleaching chamber. Hot oil to be heat-bleached and deodorized is fed into the lower portion of the heat-bleaching chamber and is forced upward by the addition of new oil. After the oil reaches the top of the heat-bleaching chamber, it is transferred to the top of the central packed deodorization chamber into which it flows downward and is deodorized by contact with a countercurrent stream of hot steam.

BACKGROUND OF THE INVENTION

The field of this invention is the processing of edible fats and oils. The invention relates to apparatus and a process for continuous heat-bleaching and steam deodorization of edible oils at high temperatures. More specifically it relates to apparatus for continuous heat-bleaching and steam deodorizing edible oils containing odoriferous materials in an integrated unit, comprising an inner vertical packed deodorization chamber and a vertical annular heat-bleaching chamber surrounding the deodorization chamber. In addition, this invention relates to a process for continuously heat-bleaching and steam deodorizing edible oils, preferably in the apparatus of the invention, by passing edible oil up through the annular heat-bleaching chamber and then down through the inner packed deodorization chamber, while passing steam up through the deodorization chamber countercurrent to the oil.

Steam deodorization of edible oils is the removal, by various kinds of steam contacting, of free fatty acids and volatile odoriferous and flavorous materials which are responsible for the smell and taste of undeodorized oil. In processing edible oils, steam deodorization usually occurs after (1) refining, which removes gross amounts of impurities from the oils; (2) adsorptive bleaching, which adsorbs certain coloring materials from the oils with bleaching earth; and (3) hydrogenation (in the case of hydrogenated oils), which allows the separation of remaining odoriferous materials to be more easily accomplished. The generally slow batch, semi-continuous or continuous deodorization processes of the prior art simultaneously accomplish a final decolorization ("heat-bleaching") by breaking down pigments which are unstable to heat. Heat-bleaching is accomplished by holding oil at high temperature for sufficient lengths of time (see for example D. Swern, ed., Bailey's Industrial Oil and Fat Products (3rd ed., 1964), page 901). Prior to the present invention, however, it has not been possible to heat-bleach oil as conveniently as is now possible. Moreover, with the development of new and more rapid continuous deodorization systems, sufficient heat-bleaching does not occur during the deodorization step alone, and thus there is a distinct need for rapid continuous deodorization and heat-bleaching apparatus and processes.

SUMMARY OF THE INVENTION

In view of the above stated need, the present invention provides an integrated apparatus for continuously heat-bleaching and deodorizing an edible oil containing odoriferous materials, wherein oil flows upward through a heat-bleaching chamber and then downward through a packed deodorization chamber, and steam flows through the packed deodorization chamber countercurrent to the flow of oil, which comprises:

(1) a vertical packed deodorization chamber comprising
  (a) a vertical deodorization chamber casing,
  (b) a deodorization chamber packing support within the deodorization chamber and in the lower portion thereof,
  (c) an oil distributor within the deodorization chamber and in the upper portion thereof, and
  (d) a packing material within the deodorization chamber and between the deodorization chamber packing support and the oil distributor;
(2) a vertical annular heat-bleaching chamber surrounding the vertical packed deodorization chamber and comprising
  (a) a vertical inner wall consisting of the vertical deodorization chamber casing,
  (b) a vertical outer wall surrounding the inner wall, and
  (c) a floor connecting the inner and outer walls of the annular heat-bleaching chamber;
(3) means for introducing oil to be heat-bleached and deodorized into the lower portion of the heat-bleaching chamber;
(4) means for transferring heat-bleached oil from the upper portion of the heat-bleaching chamber to the upper portion of the packed deodorization chamber;
(5) means for introducing steam into the lower portion of the packed deodorization chamber;
(6) means for withdrawing heat-bleached and deodorized oil from the lower portion of the packed deodorization chamber;
(7) means for withdrawing steam and volatilized odoriferous materials from the upper portion of the packed deodorization chamber; and
(8) means for maintaining within the apparatus a partial vacuum.

Furthermore, the present invention provides a process for continuously heat-bleaching and deodorizing an edible oil containing odoriferous materials, preferably in the apparatus described above, which comprises continuously:

(1) introducing a feed stream of oil to be heat-bleached and deodorized, at a temperature of about 350° F. to about 500° F., into the lower portion of a heat-bleaching zone surrounding a deodorization zone containing packing, at a rate such that the residence time of the oil within the heat-bleaching zone ranges from about 30 seconds to about 6 hours, whereby the oil is heat-bleached;
(2) transferring heat-bleached oil from the upper portion of the heat-bleaching zone to the upper portion of the deodorization zone;
(3) allowing the oil to flow downward through the deodorization zone;
(4) introducing a feed stream of steam into the lower portion of the deodorization zone, countercurrent to the flow of oil, to volatilize the odoriferous materials in the oil and deodorize the oil;
(5) withdrawing heat-bleached and deodorized oil from the lower portion of the deodorization zone;

(6) withdrawing the steam and the volatilized odoriferous materials from the upper portion of the deodorization zone; and (7) maintaining within the heat-bleaching and deodorization zones a partial vacuum.

The advantages of the apparatus and process outlined above are many. By use of a heat-bleaching chamber to heat-bleach oil, which previously has been accomplished simultaneously with steam deodorization, the steam deodorization process itself need no longer consume the time necessary to heat-bleach the oil. As a result, high-speed steam deodorization processes, as for example that described in the concurrently filed and commonly assigned copending application of Joseph S. Baker and James B. Edwards, Ser. No. 723,308, and now U.S. Pat. No. 3,506,696, issued April 14, 1970, can be utilized without regard for their heat-bleaching efficiency.

Furthermore, by use of an integrated unit containing both a heat-bleaching chamber and a deodorization chamber, economies of construction and operation are possible—i.e., common walls can be used between the two chambers, only a single unit need be heated and insulated, and there is no need to pump oil from one chamber to the other. By use of an annular heat-bleaching chamber surrounding the deodorization chamber, construction and heating are particularly economical, and a diminished amount of plant space is required to accomplish both heat-bleaching and deodorization processing steps. The annular shape of the heat-bleaching chamber makes possible the attainment of approximately plug flow in the heat-bleaching chamber when oil is continuously introduced into the lower portion of the heat-bleaching chamber. This is particularly so in a preferred embodiment of the invention in which an oil distributor is utilized within the annular heat-bleaching chamber to distribute the oil evenly across the horizontal cross-sectional area of the heat-bleaching chamber in both radial and circumferential directions. The attainment of approximately plug flow means that there is little backmixing of the oil as it rises in the heat-bleaching chamber, and all parts of the oil have approximately the same residence time within the heat-bleaching chamber. This is highly desirable, since the size of the heat-bleaching chamber and the oil flow rate can be regulated to provide an average residence time within the unit close to the minimum time required to accomplish the desired degree of heat-bleaching.

Figure 1:
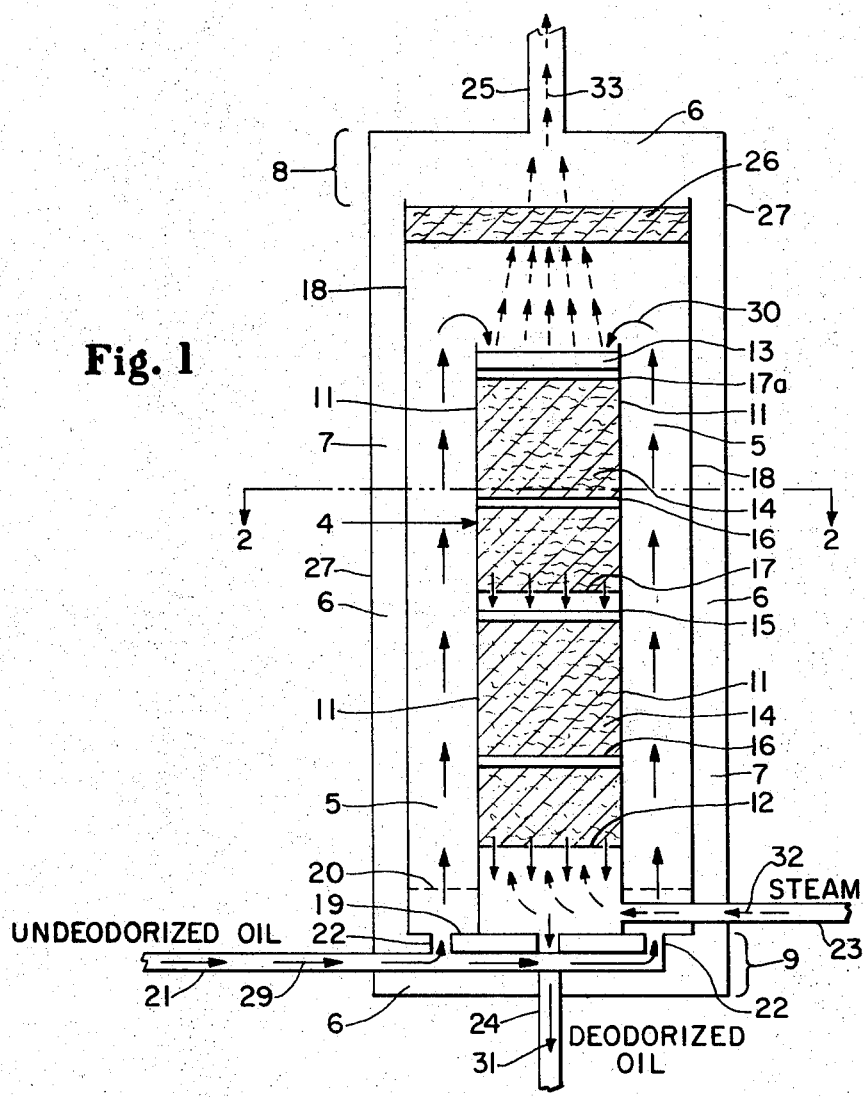
FIG. 1 is a schematic, vertical section representation of a preferred embodiment of the apparatus of this invention.

The apparatus as illustrated is broadly divided into three chambers, namely a central vertical packed deodorization chamber 4; a vertical annular heat-bleaching chamber 5 surrounding the vertical packed deodorization chamber 4; and a protective vacuum barrier 6 enclosing the vertical annular heat-bleaching chamber 5. The protective vacuum barrier 6 comprises an annular portion 7, an upper terminal portion 8, and a lower terminal portion 9.

The vertical packed deodorization chamber 4 is bounded on its sides by a vertical deodorization chamber casing 11, on the bottom by a deodorization chamber packing support 12, and on the top by an oil distributor 13. Within the vertical packed deodorization chamber 4 is a packing material 14.

The vertical annular heat-bleaching chamber 5 is bounded by an inner wall consisting of the vertical deodorization chamber casing 11, a vertical outer wall 18 surrounding the inner wall 11, and a floor 19 connecting the inner and outer walls 11 and 18 of the annular heat-bleaching chamber 5. The upper end of the vertical annular heat-bleaching chamber 5 is open.

The protective vacuum barrier 6 is bounded by the outer wall 18 of the vertical annular heat-bleaching chamber 5 and by a pressure-tight outer casing 27.

The flow of oil through the apparatus is indicated by solid-line arrows (e.g., 29, 30 and 31). The flow of steam is indicated by the broken-line arrows (e.g., 32 and 33).

DETAILED DESCRIPTION

With further reference to the drawing, the central portion of the apparatus of this invention is a vertical packed deodorization chamber 4. This chamber has a vertical deodorization chamber casing 11, which is preferably cylindrical in shape. Within the deodorization chamber 4, and in the lower portion thereof, is a deodorization chamber packing support 12. Also within the deodorization chamber 4, but in the upper portion thereof, is an oil distributor 13, which distributes oil evenly across the horizontal cross-sectional area of the deodorization chamber 4. Between the packing support 12 and the oil distributor 13, and within the deodorization chamber 4, a packing material 14 is provided. It is highly desirable to provide oil redistributors 15 and 16 intermittently within the packed deodorization chamber 4. Depending on the nature of the oil redistributor, a secondary packing support 17 can be placed above the oil redistributor 15 as shown above. Redistributors are preferably provided every 3 to 10 feet of packing material.

It is preferred to include a hold-down plate 17a within the packed deodorization chamber 4, above the packing material 14, but below the oil distributor 13. The hold-down plate 17a prevents the packing material 14 from being drawn up into the oil distributor 13 by the passage of steam during operation of the unit.

Figure 2:
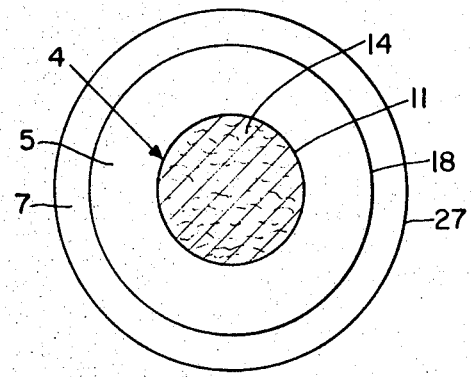
FIG. 2 is a horizontal section of the apparatus, taken on line 2—2 of FIG. 1.

Surrounding the vertical packed deodorization chamber 4 is a vertical annular heat-bleaching chamber 5. The vertical inner wall 11 of the annular heat-bleaching chamber is the vertical deodorization chamber casing 11 described above. Surrounding this inner wall 11 is a vertical outer wall 18 which, like the inner wall 11, is preferably cylindrical in shape. That is to say, the cross section of both walls 11 and 18 is preferably circular, as shown in FIG. 2. Other cross-sectional shapes can be used if desired, however, such as square cross section.

The inner and outer walls 11 and 18 of the heat-bleaching chamber 5 are connected by a floor 19. Preferably, an oil distributor 20 is included in the lower portion of the heat-bleaching chamber 5, in order to distribute the oil evenly across the horizontal cross-sectional area of the heat-bleaching chamber 5, in both radial and circumferential directions. Structurally, the oil distributor 20 can be merely a perforated plate; or a more complex structure of a conventional type, of which several are commercially available, can be used, if desired.

The apparatus is provided with means for introducing oil to be heat-bleached and deodorized into the lower portion of the heat-bleaching chamber 5, shown here as oil inlet conveyance 21. Preferably, the oil inlet conveyance 21 is provided with a plurality of delivery points 22, circumferentially distributed about the lower portion of the heat-bleaching chamber 5, to aid in evenly distributing the oil.

The apparatus is also provided with means for transferring heat-bleached oil from the upper portion of the heat-bleaching chamber 5 to the upper portion of the packed deodorization chamber 4. This is conveniently and preferably accomplished as shown in FIG. 1, by constructing the inner wall 11 to a lower height than the outer wall 18 so that as additional quantities of oil are introduced into the lower portion of the heat-bleaching chamber 5, oil in the upper portion of the heat-bleaching chamber 5 is forced as shown at 30 over the top of the inner wall 11. Alternatively, inner wall 11 and outer wall 18 can be approximately equal in height, and passageways (not shown) in the upper portion of the inner wall 11 can be provided above the oil distributor 13.

The apparatus is further provided with means for introducing steam into the lower portion of the packed deodorization chamber 4, shown here as steam inlet conveyance 23; means for withdrawing heat-bleached and deodorized oil from the lower portion of the packed deodorization chamber 4, shown here as oil outlet conveyance 24, and means for withdrawing steam and volatilized odoriferous materials from the upper portion of the packed deodorization chamber 4, shown here as steam and volatilized odoriferous materials outlet conveyance 25. In conjunction with the withdrawal of steam and volatilized odoriferous materials from the upper portion of the packed deodorization chamber 4, it is desirable and preferred to include within the apparatus an oil entrainment separator 26, constructed for example of stainless steel mesh, between the oil distributor 13 and the outlet conveyance 25. Although the oil entrainment separator 26 is shown contiguous to the outer heat-bleaching chamber wall 18, as is preferable, it could alternatively be installed in the upper portion of the packed deodorization chamber 4, above the oil distributor 13. In this event, passageways (not shown) in the deodorization chamber casing 11 should be provided, between the oil distributor 13 and the oil entrainment separator 26, to allow heat-bleached oil to be transferred from the upper portion of the heat-bleaching chamber 5 to the upper portion of the packed deodorization chamber 4.

Finally, the apparatus is provided with means for maintaining a partial vacuum within the apparatus. This is conveniently and preferably accomplished by enclosing the entire apparatus described above in a pressure-tight outer casing 27 and evacuating the apparatus by applying vacuum to the outlet conveyance 25, thereby enveloping the apparatus in a protective vacuum barrier 6, and maintaining within the apparatus a partial vacuum. The pressure-tight outer casing 27 and the annular heat-bleaching chamber outer wall 18 should be about one-half to two inches from each other, in order to provide the protective vacuum barrier 6 with adequate insulating properties.

As an alternative to the structure illustrated, the pressure-tight outer casing 27 can incorporate the outer wall 18 of the annular heat-bleaching chamber, eliminating the annular portion 7 of the protective vacuum barrier 6. In this event it is desirable to provide a supplementary vacuum connection to the remaining lower terminal portion 9 of the protective vacuum barrier 6, in order to withdraw any air which happens to accidentally enter the apparatus through the fittings of the inlet and outlet conveyances 21, 23, and 24. Without such a supplementary vacuum connection, any air so entering the apparatus would be drawn into the packed deodorization chamber 4, creating the possibility of oxidizing the hot oil therein. This alternative structure has the advantage of simplifying construction of the apparatus, since one less wall is required.

In the preferred embodiment of the invention, i.e., the apparatus illustrated, however, no supplementary vacuum connection is needed. The pressure-tight outer casing 28 is distinct and separated by a protective vacuum barrier 6 from the outer wall 18 of the heat-bleaching chamber. Any air leaking into the apparatus through the fittings of the inlet and outlet conveyances 21, 23, and 24 is drawn off through the path of lesser resistance, i.e., via the protective vacuum barrier 6 between the outer wall 18 of the annular heat-bleaching chamber 5 and the outer casing 27. Thus, any leaking air does not risk contact with the hot oil. This structure also has the advantage that the outer casing 27 need not be constructed of a material which is inert to reaction with hot oil; and the outer wall 18 of the heat-bleaching chamber need not be constructed with sufficient strength to maintain a vacuum within the heat-bleaching chamber 5. Furthermore, the protective vacuum barrier 6 between the two walls 18 and 27 provides insulation against heat loss. Furthermore, the inner wall 11 and, as mentioned above, the outer wall 18 of the vertical annular heat-bleaching chamber 5 are not required to maintain a vacuum. This is always true with respect to inner wall 11, but it is true with respect to outer wall 18 only when a separate outer casing 27 is provided. Thus, these walls 11 and 18 can be very thin, and it is preferred that they be as thin as the structural strength necessary to retain the oil within the annular heat-bleaching chamber 5 will allow. By constructing inner wall 11 of a material which transfers heat readily, the temperature within the deodorization chamber 4 and the heat-bleaching chamber 5 is approximately the same throughout both units, thereby making the heat-bleaching and deodorization operation more uniform and efficient from a heat standpoint. Outer wall 18 should be thin for economical considerations.

In addition, outer casing 27 can be made of a material (e.g., carbon steel) which is economically optimum for holding pressure and heat, without the worry of contamination of the oil, since the outer casing 27 does not contact the oil. Also, the protective vacuum barrier 6 insulates the apparatus and assists in maintaining the desired temperature within the deodorization chamber 4 and the heat-bleaching chamber 5.

The operation of the apparatus is illustrated by following the flow of oil, illustrated by solid-line arrows (e.g., 29, 30 and 31), and the flow of steam, illustrated by the broken-line arrows (e.g., 32 and 33), through the various parts of the apparatus. Oil to be heat-bleached and deodorized, at a temperature of about 350° F. to about 500° F., is introduced at 29 into the lower portion of the heat-bleaching chamber 5 at several delivery points 22. The delivery rate of the oil is correlated with the volume of the heat-bleaching chamber 5 to provide the desired residence time of the oil within the heat-bleaching chamber 5. The volume of the heat-bleaching chamber 5 is in turn controlled by its height and the spacing between inner wall 11 and outer wall 18 of the annular heat-bleaching chamber 5.

Oil which has been introduced into the lower portion of the annular heat-bleaching chamber 5 is then forced through oil distributor 20, which distributes the oil circumferentially and radially about the lower portion of the annular heat-bleaching chamber 5. With adequate oil distribution and utilizing an annular shape for the heat-bleaching chamber 5, additional oil forced into the lower portion of the chamber causes the oil to rise in a flow pattern which approximates plug flow, so that there is little backmixing of the oil.

By the time the hot oil reaches the upper portion of the annular heat-bleaching chamber 5, it has been sufficiently heat-bleached that heat-bleaching will be completed during deodorization. The oil is then transferred to the upper portion of the packed deodorization chamber as shown at 30. The oil is spread over the horizontal cross-sectional area of the packed deodorization chamber 4 by the oil distributor 13. The oil then falls downward in a film over the packing 14 and through the deodorization chamber packing support 12. In its descent, the oil has a tendency to migrate to the edge of the chamber, but this tendency can be offset by use of the preferred oil redistributors 15 and 16.

Steam is introduced at 32 into the lower portion of the packed deodorization chamber 4, countercurrent to the downward flow of oil. The steam contacts the film of oil flowing down over the packing 14, and the odoriferous materials in the oil are volatilized, whereby the oil is deodorized. The steam and volatilized odoriferous materials are withdrawn from the upper portion of the packed deodorization chamber 4 through the steam and volatilized odoriferous materials outlet conveyance 25, as shown at 33.

By the time the oil has passed down through the packed deodorization chamber 4 and has contacted the rising countercurrent stream of steam therein, it has been both completely heat-bleached and deodorized; it is withdrawn from the apparatus through oil outlet conveyance 24, as shown at 31.

The edible oils which can be heat-bleached and deodorized in the apparatus and by the process of this invention include various substances of plant or animal origin which consist predominantly of glyceryl esters of fatty acids, e.g., triglycerides, including both those commonly called "oils" which are liquid at atmospheric pressure and room temperature, and those commonly called "fats" which are solid or semisolid under these conditions, but liquid at the temperature of heat-bleaching and deodorization (i.e., about 350° F.–500° F.). Preferred oils are tallow, lard, and the common edible vegetable oils used for the production of salad oil and shortenings, e.g., cottonseed, peanut, safflower, palm, soybean, rapeseed, sunflower, corn, and coconut oils. The invention is particularly applicable to the heat-bleaching and deodorization of soybean oil.

The materials of construction of the apparatus should be selected so that at no time does oil over a temperature of about 150° F. come into contact with a material (such as carbon steel) which can damage the oil by repeated contact. It is therefore highly preferred to construct the entire apparatus as shown in the drawing, except the parts such as the pressure-tight outer casing 27 which do not come into contact with the oil, of stainless steel. A type of steel which is highly desirable for this purpose is American Iron and Steel Institute Type 304 stainless steel, which has the following chemical composition:

| | Percent |
|---|---|
| Carbon | [1] 0.08 |
| Manganese | [1] 2.00 |
| Phosphorus | [1] 0.045 |
| Sulfur | [1] 0.030 |
| Silicon | [1] 1.00 |
| Chromium | 18.00–20.00 |
| Nickel | 8.00–12.00 |
| Iron | Balance |
| | 100.00 |

[1] Maximum.

The outer casing 27 can be constructed of other materials, e.g., carbon steel. The thickness of the walls of the various chambers, namely the vertical packed deodorization chamber 4, the vertical annular heat-bleaching chamber 5, and the protective vacuum barrier 6, should be within the following ranges:

(1) vertical deodorization chamber casing and annular heat-bleaching chamber inner wall 11: from about 30 to about 0000000 gauge, preferably from about 16 to about 1 gauge.
(2) annular heat-bleaching chamber outer wall 18: from about 30 to about 0000000 gauge, preferably from 16 to about 1 gauge.
(3) pressure-tight outer casing 27: from about 20 to about 0000000 gauge, preferably from about 12 to about 0000 gauge.
(4) in the alternative structure in which the pressure-tight outer casing 27 incorporates the annular heat-bleaching chamber outer wall 18, this casing: from about 20 to 0000000 gauge, preferably from about 12 to about 0000 gauge.

The preferred packing material 14 for use in the packed deodorization chamber 4 is ⅝-inch, 1-inch, 1½-inch, or 2-inch "Pall rings." "Pall rings" are a commercially available material (U.S. Stoneware Company, Akron, Ohio); similar packing is sold under the name "Flexiring" (Koch Engineering Company, Inc., Wichita, Kans.). These rings are stamped, preferably from stainless steel, and formed into open-ended cylinders of approximately equal outer diameter and height. The sides of the cylinders comprise 10 holes per cylinder formed by punching material from the sides to create 10 tongues extending into the center of the cylinder. Each tongue corresponds to, and is attached at the side of, a hole in the side of the cylinder. Except for the holes and tongues, the packing is similar to Rashig rings. Characteristics of the rings are more fully described by J. S. Eckert et al. in Chemical Engineering Progress 54, No. 1, 70–75 (January 1958); 57, No. 9, 54–58 (September 1961); 59, No. 5, 76–82 (May 1963); and 62, No. 1, 59–67 (January 1966), incorporated herein by reference.

The packing material is preferably made from stainless steel. Ceramic packings can also be used, however, if they are of sufficient stability that they do not fracture in the tower.

These preferred packings (stainless steel Pall rings), have approximately the following oil flow rate capacities, measured in pounds of oil per hour per square foot of packing materials:

⅝-inch, 5,000
1-inch, 6,500
1½-inch, 8,500
2-inch, 10,000

The diameter of the column is adjusted to give the desired deodorization capacity (oil flow rate), using a minimum diameter of about ten times the packing size.

In order to adequately deodorize oil, approximately the following heights of packing material 14 should be used, depending on packing size:

⅝-inch: from about 3 to about 60 feet, preferably from about 12 to about 20 feet.
1-inch: from about 4 to about 75 feet, preferably from about 16 to about 24 feet.
1½-inch: from about 5 to about 100 feet, preferably from about 18 to about 30 feet.
2-inch: from about 6 to about 120 feet, preferably from about 20 to about 35 feet.

In operation, oil to be heat-bleached and deodorized is fed into the lower portion of the heat-bleaching chamber 5. It is highly desirable that this oil be deaerated to a level of less than about 0.10% by volume of dissolved oxygen, and preferably less than about 0.05%, prior to heating to deodorization temperature, in order to prevent oxidation of the oil by dissolved oxygen. "Dissolved oxygen" is oxygen which becomes associated with the oil when it is exposed to the air or other oxygen-containing material, and can comprise up to about 2.5% (by volume) of a typical edible oil at room temperature (about 70° F.).

Deaerating the oil to a level of less than about 0.10% by volume of dissolved oxygen, and preferably less than about 0.05%, can be accomplished by subjecting the oil to a partial vacuum in a closed container, or by sparging, i.e., bubbling inert gas such as nitrogen through the oil. Preferably, deaeration is accomplished by heating the oil and then subjecting the heated oil to a partial vacuum in a closed container. The temperature to which the oil is heated should not be so high as to damage the oxygen-containing oil. For example, soybean oil which is saturated with air at room temperature (about 70° F.) contains about 2.5% dissolved oxygen (by volume). This oil can safely be heated to about 220° F. without degradation. With this limitation, however, oils are more quickly deaerated at high temperatures.

In order to deaerate an oil in a closed container, sufficient time must be allowed for the dissolved air to flash from the oil. The time required depends on a number of variables, but can be reduced by decreasing the viscosity of the oil (e.g., by heating) and by increasing the surface area per unit volume of oil in the container (e.g., by spraying the oil into the dryer).

Preferred conditions for deaerating the edible oil comprise (1) heating the oil to be deaerated to a temperature of about 200° F. to about 220° F., and (2) passing the oil through a gas-tight container from which oxygen is continuously removed by a vacuum pump, so that the absolute pressure within the container is about 5 to about 50 mm. Hg. Oil is preferably distributed on surfaces (e.g., packing) within the upper portion of the container, so that in draining down, sufficient time is consumed to allow the dissolved air (including dissolved oxygen) to flash from the oil.

An additional feature which is preferably included in the deaeration process and which makes deaeration more efficient is the injection into the lower portion of the container of a countercurrent flow of steam, and withdrawing the steam from the upper portion of the container. The amount of steam used can be quite low e.g., 0.25% by weight of the oil.

The oil is heated to a temperature of about 350° F. to about 500° F. after deaeration but prior to its introduction into the lower portion of the heat-bleaching chamber 5. Lower temperatures require excessive amounts of time to heat-bleach and deodorize the oil, but at temperatures over about 500° F. the oil suffers some degraration, even when it has been deaerated prior to heating. The preferred oil temperature is from about 450° F. to about 485° F.

The steam temperature is not critical, and can range from about the boiling point of water at the inlet pressure to about 600° F. Water can even be introduced in lieu of steam, since the water would be immediately vaporized and heated to the deodorization temperature by the hot deodorized oil in the lower portion of the deodorization chamber 4 and any other materials which the water contacts. This is not preferred, however, as it cools the apparatus and makes heat-bleaching and deodorization less efficient. On the other hand, steam at a temperature in excess of about 600° F. can scorch the oil, and it is unnecessary to use such high temperature steam. It is preferred that the steam temperature be within about 20 Fahrenheit degrees of the oil temperature; cooler steam cools the oil, and hotter steam is unnecessary. Thus, the preferred temperature of steam is broadly from about 330° F. to about 520° F.; when the oil is within the preferred temperature range of from about 450° F. to about 485° F., the preferred steam temperature ranges from about 430° F. to about 505° F.

The residence time of the oil within the heat-bleaching chamber 5 should range from about 30 seconds to about 6 hours. The time required is dependent upon the temperature at which heat-bleaching occurs and the lightness or darkness of the oil to be heat-bleached. The residence time obtained is dependent upon the volume of the heat-bleaching chamber 5 and the oil flow rate. Most edible oils are, however, adequately heat-bleached in about 5 to about 15 minutes within the preferred temperature range of about 450° F. to about 485° F. At about 500° F., about 30 seconds would be required to heat-bleach a light oil sufficiently that the process would be completed during deodorization. At about 350° F., however, about 6 hours would be required to heat-bleach a dark oil. The desired residence time of the oil within the heat-bleaching chamber therefore ranges from about 30 seconds to about 6 hours in order to heat-bleach the oil. From about 5 to about 15 minutes is the preferred residence time, as this is the shortest amount of time which ensures adequate heat-bleaching within the preferred temperature range, i.e., from about 450° F. to about 485° F.

The time required for deodorization depends on deodorization temperature, amount and volatility of the odoriferous materials to be volatilized, and pressure within the deodorization chamber. In accordance with the present invention, however, the residence time of the oil within the packed deodorization chamber 4 ranges from about 30 seconds to about 10 minutes, and most edible oils are adequately deodorized in about 1 to about 4 minutes within the preferred pressure ranges described below and within the preferred temperature range of about 450° F. to about 485° F.

It is to be understood that oil residence time within the deodorization chamber 4, unlike the residence time within the heat-bleaching chamber 5, depends upon several variables, for example, the packing type and size, height of packing material, and steam and oil flow rates. Other factors being equal, it can be said in general that increasing packing size and decreasing height of packing material, each decrease the residence time within the deodorization chamber 4. A low residence time requires a high quantity of steam for adequate deodorization, however. Thus a deodorization chamber 4 of greater height yields a higher residence time, but a lower steam usage.

A partial vacuum is maintained in the apparatus during operation, preferably to give a vacuum ranging from about 0.1 to about 50 mm. Hg within the lower portion of the deodorization chamber 4, i.e., at that point at which the steam is introduced into the deodorization chamber 4 and initially contacts the oil. All pressures designated herein are absolute pressures, unless otherwise indicated. Low pressure is desirable because it aids in volatilizing odoriferous materials in the oils, and because it maintains an oxygen-free atmosphere, thereby preventing oxidation of the oils. Pressures below about 1 mm. Hg are not required for these purposes, however, and are more difficult to maintain. On the other hand, pressures of about 15 mm. Hg are easily attainable, so that the preferred pressure range in the lower portion of the deodorization chamber 4 ranges from about 1 to about 15 mm. Hg.

The pressure within the deodorization chamber 4, above the point at which the steam is introduced is less than in the lower portion of the deodorization chamber 4. This is due to the pressure drop caused by the upward flow of steam through the packing material which prevents steam pressure from equalizing.

Pressures elsewhere in the apparatus, e.g., above the oil distributor 13, in the outlet conveyance 25 and throughout the protective vacuum barrier 6, are less than the pressure in the deodorization chamber 4. These pressures are directly controlled by and are essentially equal to, the vacuum applied to the apparatus. As is apparent, the vacuum applied to the apparatus also controls the pressure in the deodorization chamber 4 including the lower portion thereof where steam is introduced and initially contacts the oil.

Throughout this specification, reference is made to steam as the deodorization agent. Steam is highly preferred for this purpose, as it is readily available in high purity and because it does not injure the oils being deodorized. Other deodorization agents can be used, however, for example gases which are inert under the conditions of the process, such as nitrogen or hydrogen. Oxygen and air are unsuitable, however, as they would cause oxidation and degradation of the oils being deodorized.

The deodorization chamber per se and its components can be any type of packed vapor-liquid contacting chamber, such as those which are well known in the chemical enginering art. See, for example, R. H. Perry et al., eds., Chemical Engineers' Handbook (McGraw-Hill, 4th ed., 1963), pp. 18–25 to 18–53; J. S. Eckert et al., Chemical Engineering Progress 54, No. 1, 70–75 (January 1958), 57, No. 9, 54–58 (September 1961), 59, No. 5, 76–82 (May 1963), and 62, No. 1, 59–67 (January 1966); and K. E. Porter, Chemistry and Industry 182–89 (Feb. 4, 1967). These references also describe various kinds of packing materials which can be used.

A preferred embodiment of such a chamber is illustrated in the drawing and described above. A particularly preferred process for continuous high temperature steam deodorization for use in the apparatus and process of the present invention is disclosed in the concurrently filed and commonly assigned copending application of Joseph S. Baker and James B. Edwards, Ser. No. 723,308, incorporated herein by reference.

EXAMPLE

The apparatus and process of this invention were utilized to heat-bleach and deodorize hydrogenated and unhydrogenated soybean oils, as well as unhydrogenated cottonseed oil.

The central portion of the apparatus used in this example was a vertical packed cylindrical deodorization chamber 4 about 6 inches in inside diameter and about 18 feet high. An expanded metal packing support 12 was placed within the deodorization chamber 4, in the lower portion thereof, about 24 inches from the bottom. A packing material 14 was placed within the deodorization chamber 4 above the support plate 12, providing a height of 16 feet of packing. Four oil redistributors 16 were placed within the packing material 14 at approximately equal spacing.

Each oil redistributor 16 comprised an open-ended cylinder of 16 gauge stainless steel 4.87 inches in outside diameter and 4 inches in height. The base of the cylinder was provided with a horizontal disc-shaped apron which extended from the base of the cylinder to the inside of the deodorization chamber casing 11, but which did not cover the end of the cylinder itself. At the base of the cylinder, just above the apron, four circular openings ⅜-inch in diameter and 90° apart were provided, each of which was connected to a 20 gauge stainless steel pipe ⅜-inch in diameter and 1¼-inch in length, extending into the cylinder. Thus, any oil which migrated to the inside of the deodorization chamber casing 11 was caught and rechanneled into the central portion of the deodorization chamber 4.

At the top of the 16 feet of packing was placed a hold-down plate 17a and a combination oil distributor 13 and oil entrainment separator 26. The oil distributor 13 was similar to the oil redistributors 16 described above, except as noted below. The circular openings in the base of the cylinder were eight in number and ½-inch in diameter, and were placed 45° apart. Each was connected to a ½-inch pipe; these were alternatively ⅝-inch and 1¼-inch in length.

The height of the oil distributor cylinder was 24 inches. It was provided with an expanded metal packing support over its lower end, and was filled with packing material to provide an oil entrainment separator 26.

The packing material used in both the oil entrainment separator and the deodorization chamber was ⅝-inch stainless steel Pall rings, as described above.

Surrounding the vertical packed deodorization chamber 4 was a vertical annular heat-bleaching chamber 5, comprising (a) a vertical inner wall consisting of the deodorization chamber casing 11 described above; (b) a vertical outer wall 18 surroundng the inner wall, about 8⅝-inches in inside diameter (providing an annular radius in the chamber of about 1¼-inches) and about 22 feet in height; and (c) a floor 19 connecting the inner and outer walls. The height of the heat-bleaching chamber 5 available for heat-bleaching was limited by the height of the inner wall 11 (about 18 feet), and so the oil capacity of the heat-bleaching chamber 5 was about 3.7 cubic feet. A perforated plate was included in the base of the heat-bleaching chamber 5 as an oil distributor 20 to distribute the oil evenly across the horizontal cross-sectional area of the heat-bleaching chamber 5 in both radial and circumferential directions.

The components of the apparatus described above (vertical packed deodorization chamber 4 including casing 11, packing support 12, packing material 14, oil redistributors 16 and oil distributor 13; vertical annular heat-bleaching chamber, including inner wall 11, outer wall 18 and floor 19; and oil entrainment separator 26) were constructed of AISI type 304 stainless steel. These components were enclosed in a pressure-tight outer casing 27 constructed of carbon steel, about 10 inches in inside diameter, and with 0.365-inch wall thickness (American Standards Association schedule 40 pipe of 10 inch nominal diameter) providing an annular radius of about ¾-inch in the annular portion 7 of the protective vacuum barrier 6. The deodorization chamber casing 11 and the annular heat-bleaching chamber casing 18 were constructed of 16 and 12 gauge steel, respectively. Oil and steam inlets 21 and 23, respectively, and an oil outlet 24 were provided in the lower portion of the apparatus (type 304 stainless steel pipe). The upper portion of the apparatus was provided with means 25 for withdrawing steam and volatilized odoriferous materials from the upper portion of the packed deodorization chamber 4, namely a vapor line which was connected to a steam ejector system. The vapor line was used to apply a partial vacuum of 5 mm. Hg to the outlet conveyance 25, which vacuum was maintained during the operation of the apparatus. This provided a pressure of 13 mm. Hg in the lower portion of the deodorization chamber 4 at the point at which steam was introduced and initially contacted the oil.

In operation, hydrogenated and unhydrogenated soybean oils (2 trials each), and unhydrogenated cottonseed oils (3 trials) were heat-bleached and deodorized in the apparatus. These oils had been refined, adsorptively bleached with bleaching earth, and deaerated to a level of about 0.08% by volume of dissolved oxygen.

Oil to be heat-bleached and deodorized, at a temperature of 480° F., was introduced into the lower portion of the heat-bleaching chamber 5, below the oil distributor 20, at a rate of 1000 pounds (about 21 cubic feet) per hour. This provided a residence time of the oil within the heat-bleaching chamber 5 of about 11 minutes, during which the oil rose in the annular heat-bleaching chamber 5 in approximately plug flow.

After heat-bleaching, the oil was forced over the top of the deodorization chamber casing 11 and thus transferred from the upper portion of the heat-bleaching chamber 5 to the upper portion of the deodorization chamber 4. The oil was then allowed to flow downward through the packing material 14, requiring about 1 to 2 minutes to do so. This caused contact of the oil and a countercurrent stream of steam at about 480° F., and in an amount of about 0.25 to about 0.5% by weight of the oil, which was introduced into the lower portion of the packed deodorization chamber 4. The oil was thus deodorized by the volatilization of volatile odoriferous materials in the oil. Heat-bleached and deodorized oil was withdrawn from the lower portion of the packed deodorization chamber 4, while steam and volatilized odoriferous materials were withdrawn from the upper portion of the packed deodorization chamber 4 through the oil entrainment separator 26 and vapor line to the steam ejector system.

The oils were adequately heat-bleached and deodorized by the above process. The adequacy of deodorization was determined by taste of the oils. The oils showed the following reductions in color, as measured by the Lovibond Red color of the oil before and after heat-bleaching and deodorization:

| Oil | Initial color | Final color |
| --- | --- | --- |
| Hydrogenated soybean oil: | | |
| First trial | 2.8 | 0.4 |
| Second trial | 3.0 | 0.5 |
| Unhydrogenated soybean oil: | | |
| First trial | 5.6 | 0.6 |
| Second trial | 5.6 | 0.6 |
| Unhydrogenated cotton seed oil: | | |
| First trial | 1.6 | 1.0 |
| Second trial | 1.1 | 0.6 |
| Third trial | 1.2 | 0.5 |

What is claimed is:

1. Apparatus for continuously heat-bleaching and deodorizing an edible oil containing odoriferous materials, wherein oil flows upward through a heat-bleaching chamber and then downward through a packed deodorization chamber, and steam flows through the packed deodorization chamber countercurrent to the flow of oil, which comprises:

(1) a vertical packed deodorization chamber comprising
   (a) a vertical deodorization chamber casing,
   (b) a deodorization chamber packing support within the deodorization chamber and in the lower portion thereof,
   (c) an oil distributor within the deodorization chamber and in the upper portion thereof, and
   (d) a packing material within the deodorization chamber and between the deodorization chamber packing support and the oil distributor;

(2) a vertical annular heat-bleaching chamber surrounding the vertical packed deodorization chamber and comprising
   (a) a vertical inner wall consisting of the vertical deodorization chamber casing,
   (b) a vertical outer wall surrounding the inner wall, and
   (c) a floor connecting the inner and outer walls of the annular heat-bleaching chamber;

(3) means for introducing oil to be heat-bleached and deodorized into the lower portion of the heat-bleaching chamber;

(4) means for transferring heat-bleached oil from the upper portion of the heat-bleaching chamber to the upper portion of the packed deodorization chamber;

(5) means for introducing steam into the lower portion of the packed deodorization chamber;

(6) means for withdrawing heat-bleached and deodorized oil from the lower portion of the packed deodorization chamber;

(7) means for withdrawing steam and volatilized odoriferous materials from the upper portion of the packed deodorization chamber; and (8) means for maintaining within the apparatus a partial vacuum.

2. The apparatus of claim 1, comprising in addition an oil distributor within the heat-bleaching chamber and in the lower portion thereof.

3. The apparatus of claim 2, comprising in addition a hold-down plate within the vertical packed deodorization chamber and in the upper portion thereof, above the packing material and below the oil distributor.

4. The apparatus of claim 3, comprising in addition an oil entrainment separator within the upper portion of the apparatus, above the oil distributor within the vertical packed deodorization chamber.

5. The apparatus of claim 4, comprising in addition a plurality of oil redistributors within the deodorization chamber.

6. The apparatus of claim 5, in which the means for transferring heat-bleached oil from the upper portion of the heat-bleaching chamber to the upper portion of the packed deodorization chamber comprises the vertical inner wall of the annular heat-bleaching chamber being of a lower height than the outer wall of the annular heat-bleaching chamber.

7. The apparatus of claim 6, in which the means for maintaining within the apparatus a partial vacuum comprises a pressure-tight outer casing which comprises the vertical outer wall of the vertical annular heat-bleaching chamber.

8. The apparatus of claim 6, in which the means for maintaining within the apparatus a partial vacuum comprises a pressure-tight outer casing distinct and separated by an annular space from the vertical outer wall of the vertical annular heat-bleaching chamber.

9. A process for continuously heat-bleaching and deodorizing an edible oil containing odoriferous materials which comprises continuously:

(1) introducing a feed stream of oil to be heat-bleached and deodorized, at a temperature of about 350° F. to about 500° F., into the lower portion of a heat-bleaching zone surrounding a deodorization zone containing packing, at a rate such that the residence time of the oil within the heat-bleaching zone ranges from about 30 seconds to about 6 hours, whereby the oil is heat-bleached;

(2) transferring heat-bleached oil from the upper portion of the heat-bleaching zone to the upper portion of the deodorization zone;

(3) allowing the oil to flow downward through the deodorization zone;

(4) introducing a feed stream of steam into the lower portion of the deodorization zone, countercurrent to the flow of oil to volatilize the odoriferous materials in the oil and deodorize the oil;

(5) withdrawing heat-bleached and deodorized oil from the lower portion of the deodorization zone;

(6) withdrawing the steam and the volatilized odoriferous materials from the upper portion of the deodorization zone; and (7) maintaining within the heat-bleaching and deodorization zones a partial vacuum.

10. The process of claim 9 in which the temperature of the feed stream of oil ranges from about 450° F. to about 485° F.; the temperature of the feed stream of steam ranges from about 430° F. to about 505° F.; and in which the oil is deaerated to a level of less than about 0.10% by volume of dissolved oxygen, prior to introduction into the lower portion of the heat-bleaching zone.

11. The process of claim 10, in which the oil is deaerated to a level of less than about 0.05% by volume of dissolved oxygen, prior to introduction into the lower portion of the heat-bleaching zone, and in which the oil is introduced into the lower portion of the heat-bleaching zone at a rate such that the residence time of the oil within the heat-bleaching zone ranges from about 5 minutes to about 15 minutes.

References Cited
UNITED STATES PATENTS

| | | | |
|---|---|---|---|
| 1,754,598 | 4/1930 | Bollman | 260—428 |
| 2,381,658 | 8/1945 | Fessler | 203—49 |
| 2,578,670 | 12/1951 | Carleton | 202—158 |
| 2,594,953 | 4/1952 | Mares | 260—428 |
| 2,938,838 | 5/1960 | Ballestra | 202—236 |
| 2,991,298 | 7/1961 | Raffaeta | 260—428 |

WILBUR L. BASCOMB, Jr., Primary Examiner

U.S. Cl. X.R.

99—118; 202—158, 159, 176, 197, 205, 234; 203—39, 96; 261—94